United States Patent
Lopez

(10) Patent No.: US 8,851,190 B1
(45) Date of Patent: Oct. 7, 2014

(54) BALL CHECK VALVE INTEGRATION TO ICD

(71) Applicant: Halliburton Energy Services, Inc, Houston, TX (US)

(72) Inventor: Jean Marc Lopez, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/234,390

(22) PCT Filed: Feb. 15, 2013

(86) PCT No.: PCT/US2013/026533
§ 371 (c)(1),
(2), (4) Date: Jan. 22, 2014

(87) PCT Pub. No.: WO2014/126587
PCT Pub. Date: Aug. 21, 2014

(51) Int. Cl.
*E21B 34/06* (2006.01)
(52) U.S. Cl.
CPC .................... *E21B 34/063* (2013.01)
USPC ............ 166/374; 166/376; 166/317; 166/325
(58) Field of Classification Search
CPC ....... E21B 33/10; E21B 34/063; E21B 34/08; E21B 34/10; E21B 43/12; E21B 2034/00; E21B 2034/002
USPC ......... 166/369, 373, 374, 376, 386, 317, 325, 166/329
See application file for complete search history.

(56) References Cited

U.S. PATENT DOCUMENTS

| | | | |
|---|---|---|---|
| 7,832,473 B2 * | 11/2010 | Pensgaard | 166/193 |
| 7,891,432 B2 | 2/2011 | Assal | |
| 2004/0154806 A1 | 8/2004 | Bode et al. | |
| 2007/0246210 A1 * | 10/2007 | Richards | 166/56 |
| 2007/0246407 A1 * | 10/2007 | Richards et al. | 210/97 |
| 2008/0041580 A1 * | 2/2008 | Freyer et al. | 166/193 |
| 2008/0041588 A1 | 2/2008 | Richards et al. | |
| 2008/0283238 A1 * | 11/2008 | Richards et al. | 166/228 |
| 2009/0084556 A1 | 4/2009 | Richards et al. | |
| 2009/0151925 A1 | 6/2009 | Richards et al. | |
| 2011/0073308 A1 | 3/2011 | Assal et al. | |
| 2011/0253391 A1 | 10/2011 | Veit et al. | |
| 2011/0303420 A1 | 12/2011 | Thorkildsen et al. | |
| 2012/0227823 A1 | 9/2012 | Veit | |
| 2014/0020898 A1 * | 1/2014 | Holderman et al. | 166/304 |

OTHER PUBLICATIONS

Foreign Communication from a Related Counterpart Application, International Search Report and Written Opinion dated Nov. 5, 2013, International Application Serial No. PCT/US13/26533, filed on Feb. 15, 2013.

\* cited by examiner

*Primary Examiner* — Blake Michener

(57) ABSTRACT

A production sleeve assembly for use downhole comprises a fluid pathway configured to provide fluid communication between an exterior of a wellbore tubular and an interior of the wellbore tubular, a flow restriction disposed in the fluid pathway, and a valve disposed in series with the flow restriction in the fluid pathway. The valve comprises: a rupture disk and a plug releasably engaged in the fluid pathway in series with the rupture disk. The valve is configured to allow production from the exterior of the wellbore tubular to the interior of the wellbore tubular through the chamber without producing past the plug once the rupture disk is actuated.

19 Claims, 8 Drawing Sheets

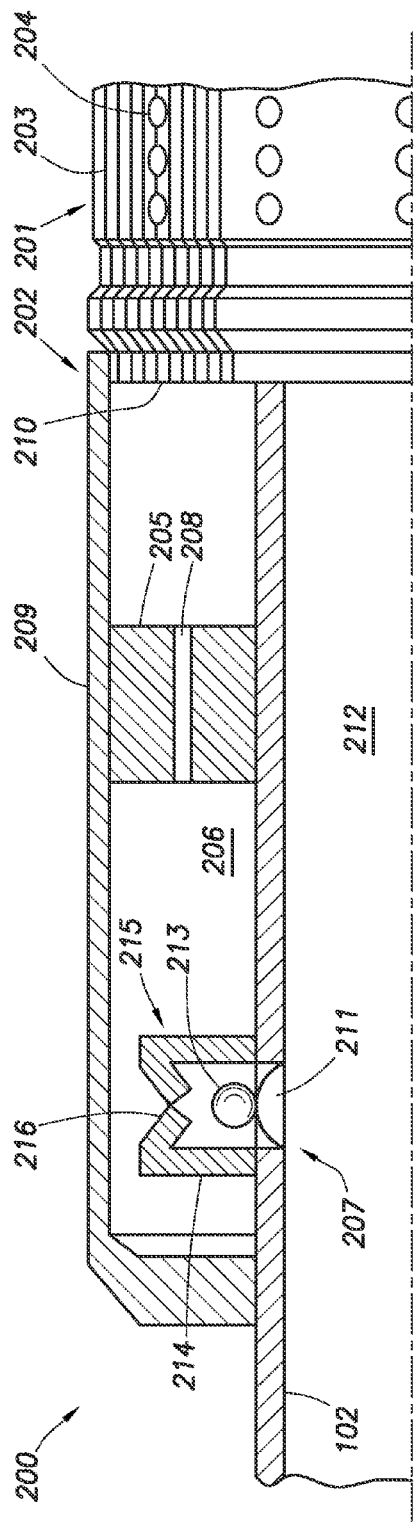
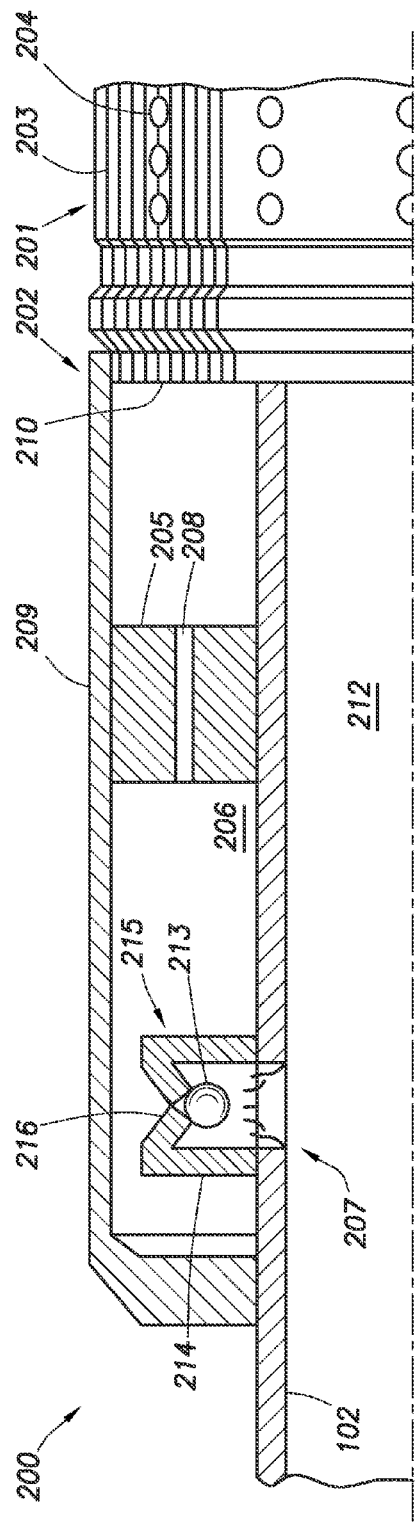
FIG.2A
FIG.2B

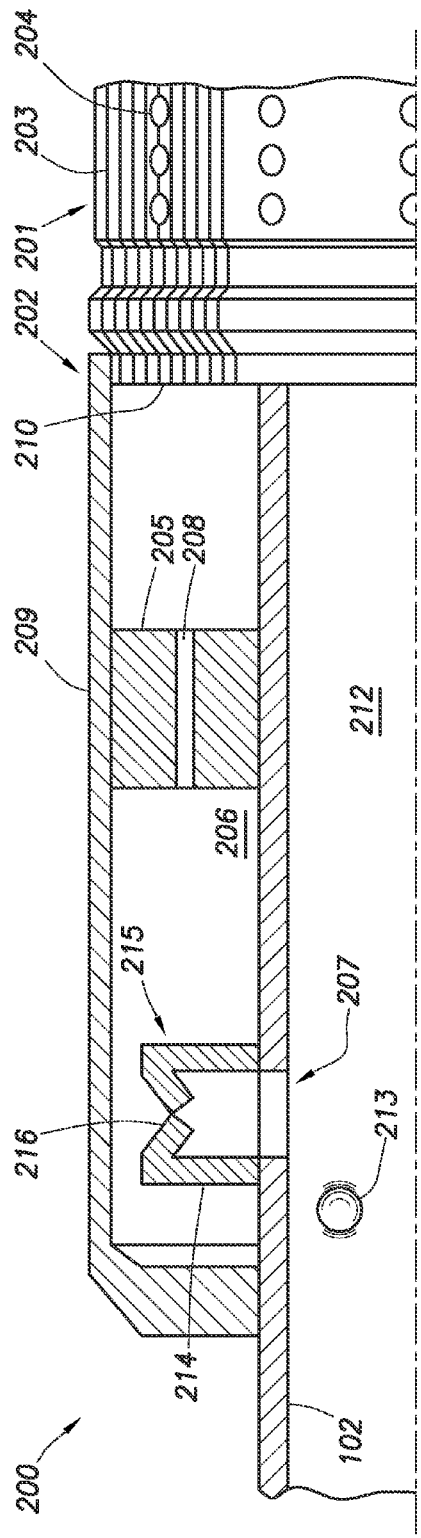
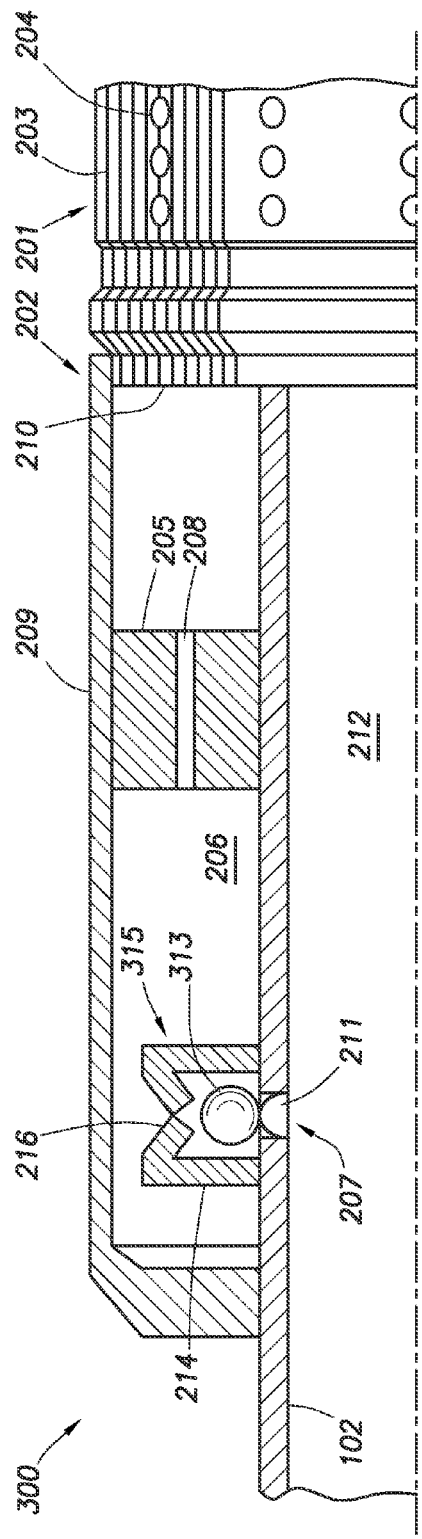

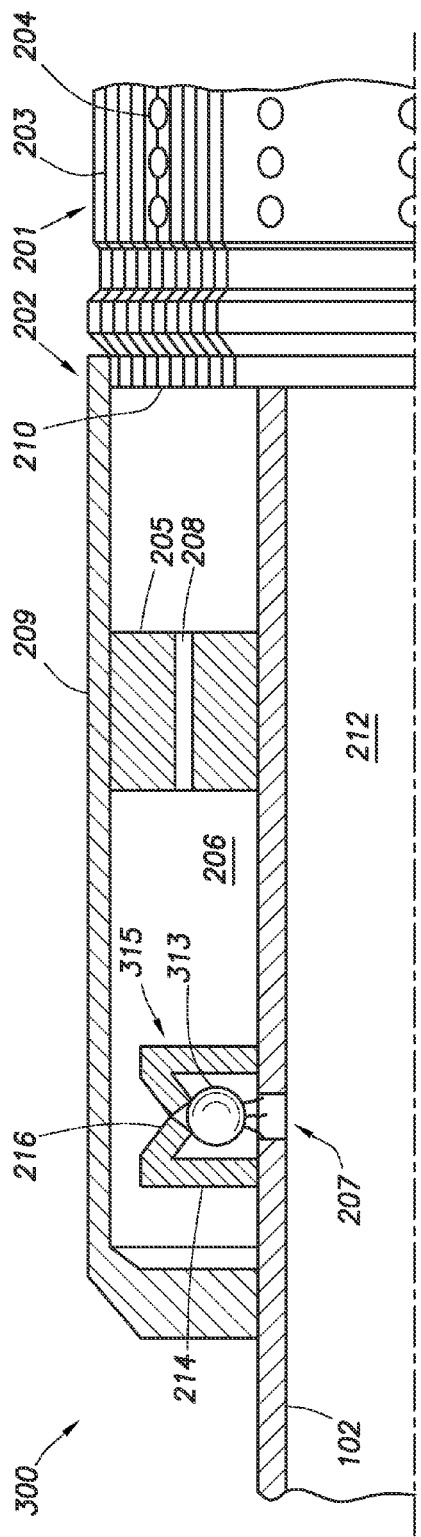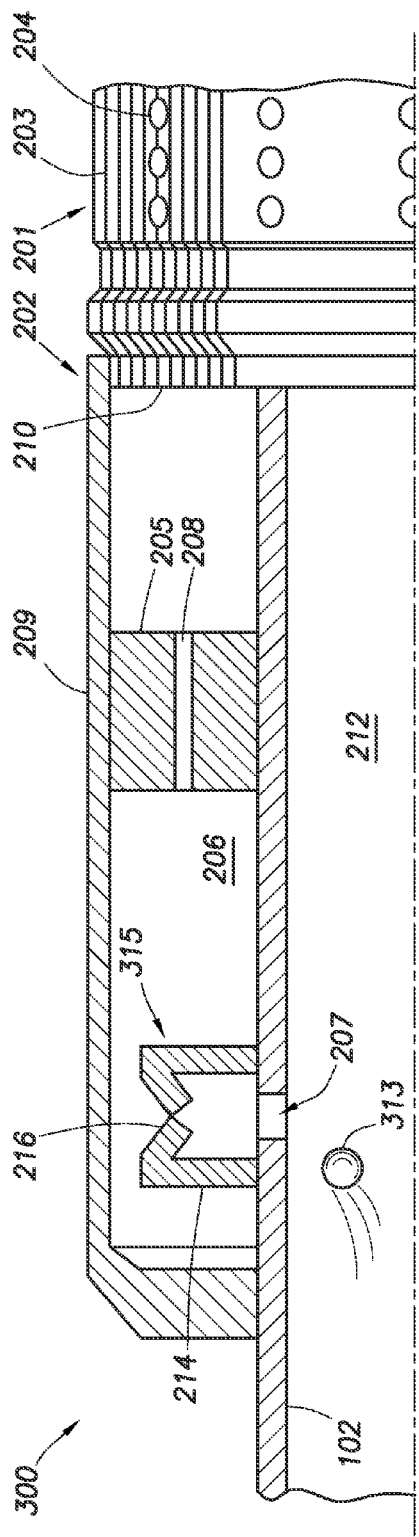

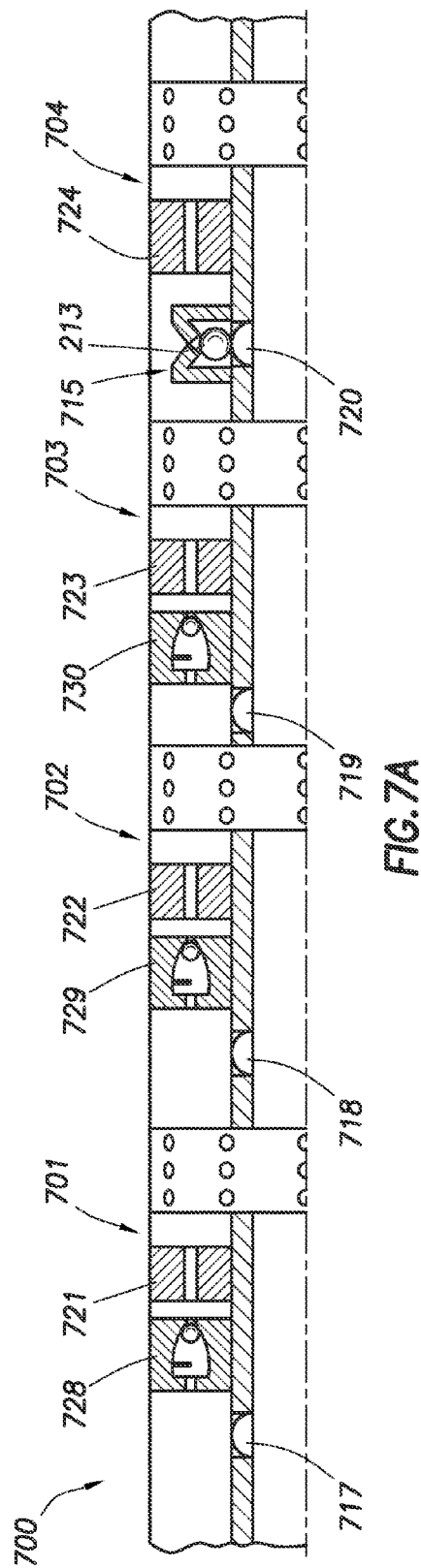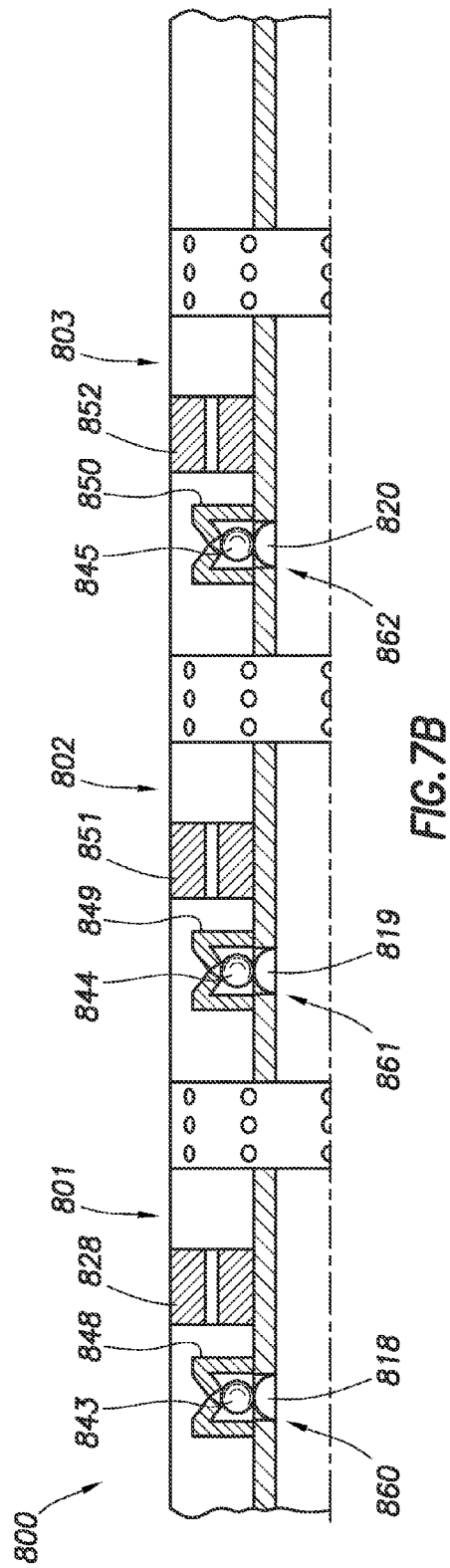

BALL CHECK VALVE INTEGRATION TO ICD

CROSS-REFERENCE TO RELATED APPLICATIONS

This application is a filing under 35 U.S.C. 371 as the National Stage of International Application No. PCT/US2013/026533, filed Feb. 15, 2013, entitled "Ball Check Valve Integration to ICD", by Jean Marc Lopez., which is incorporated herein by reference in its entirety for all purposes.

BACKGROUND

Wellbores are sometimes drilled into subterranean formations to produce one or more fluids from the subterranean formation. For example, a wellbore may be used to produce one or more hydrocarbons. Additional components such as water may also be produced with the hydrocarbons, though attempts are usually made to limit water production from a wellbore or a specific interval within the wellbore. Other components such as hydrocarbon gases may also be limited for various reasons over the life of a wellbore.

Where fluids are produced from a long interval of a formation penetrated by a wellbore, it is known that balancing the production of fluid along the interval can lead to reduced water and gas coning, and more controlled conformance, thereby increasing the proportion and overall quantity of oil or other desired fluid produced from the interval. Various devices and completion assemblies have been used to help balance the production of fluid from an interval in the wellbore. For example, inflow control devices (ICD's) have been used in conjunction with well screens to restrict the flow of produced fluid through the screens for the purpose of balancing production along an interval. For example, in a long horizontal wellbore, fluid flow near a heel of the wellbore may be more restricted as compared to fluid flow near a toe of the wellbore, to thereby balance production along the wellbore.

SUMMARY

In an embodiment, a production sleeve assembly for use downhole comprises a fluid pathway configured to provide fluid communication between an exterior of a wellbore tubular and an interior of the wellbore tubular, a flow restriction disposed in the fluid pathway, and a valve disposed in series with the flow restriction in the fluid pathway. The valve comprises: a rupture disk, and a plug releasably engaged in the fluid pathway in series with the rupture disk. The valve is configured to allow production from the exterior of the wellbore tubular to the interior of the wellbore tubular through the chamber without producing past the plug once the rupture disk is actuated.

In an embodiment, a production string for use downhole comprises a housing disposed about a wellbore tubular, where a chamber is formed between the housing and the wellbore tubular, a flow restriction disposed in the chamber, and a valve disposed in a fluid pathway between the chamber and an interior of the wellbore tubular. The valve comprises a rupture disk, and a plug disposed adjacent the rupture disk. The valve is configured to substantially block fluid flow between the interior of the wellbore tubular and the chamber in a first state, substantially prevent fluid flow from the interior of the wellbore tubular into the chamber in a second state, and allow fluid flow between the chamber and the interior of the wellbore tubular in a third state.

In an embodiment, a method of changing the flow state of a production sleeve comprises pressurizing an interior of a wellbore tubular to a first pressure, where the first pressure is greater than a second pressure in an exterior of the wellbore tubular, actuating a rupture disk in response to the first pressure, where the rupture disk is disposed in a fluid pathway between the exterior of a wellbore tubular and the interior of the wellbore tubular, maintaining the first pressure within the interior of the wellbore tubular using a plug, where the plug is releasably engaged in the fluid pathway adjacent the rupture disk, decreasing the pressure in the interior of the wellbore tubular below the second pressure, and establishing fluid communication between the exterior of the wellbore tubular and the interior of the wellbore tubular along the fluid pathway in response to the decreasing of the pressure in the interior of the wellbore tubular.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description:

FIGS. 2A, 2B, and 2C are partial cross-sectional views of a well screen assembly comprising an embodiment of a fluid flow control device.

FIGS. 3A, 3B, and 3C are partial cross-sectional views of a well screen assembly comprising another embodiment of a fluid flow control device.

FIG. 7A is a schematic illustration of a well system comprising multiple fluid flow control devices according to one embodiment.

FIG. 7B is a schematic illustration of a well system comprising multiple fluid flow control devices according to another embodiment.

DETAILED DESCRIPTION OF THE EMBODIMENTS

Figure 1:
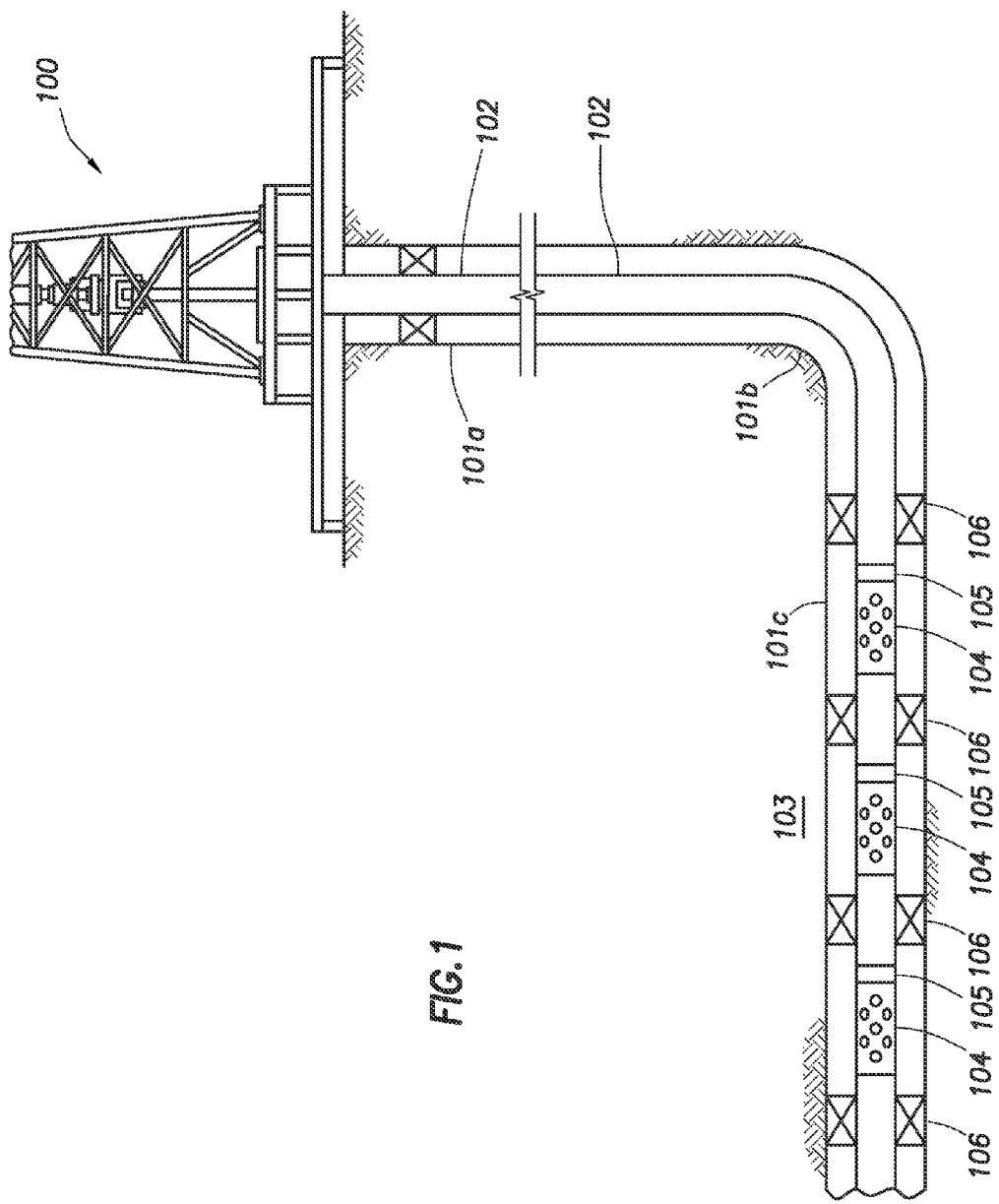
FIG. 1 is a schematic illustration of a wellbore operating environment which may support the use of at least one embodiment of a fluid flow control device.

In the drawings and description that follow, like parts are typically marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. Specific embodiments are described in detail and are shown in the drawings, with the understanding that that present disclosure is to be considered an exemplification of the principles of the invention, and is not intended to limit the invention to that illustrated and described herein. It is to be fully recognized that the different teachings of the embodiments discussed infra may be employed separately or in any suitable combination to produce desired results.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," or "above" meaning toward the surface of the wellbore and with "down," "lower," "downward," or "below" meaning toward the terminal end of the well, regardless of the wellbore orientation. The various characteristics mentioned above, as well as other features and characteristics described in more detail below, will be readily apparent to those skilled in the art with the aid of this disclosure upon reading the following detailed description of the embodiments, and by referring to the accompanying drawings.

Well systems may be used to provide a completion configuration including one or more flow restrictors intended to balance production along a section of a wellbore. A flow restrictor may form a part of a well screen assembly and thereby choke fluid flow between the subterranean formation and the wellbore interior. Such a well screen assembly may comprise a fluid pathway in series with the flow restrictor and the wellbore interior.

During installation, an actuable device can prevent fluid flow through the fluid pathway. As described herein, the present system allows for the actuation, after installation, of the actuable devices and thereby permits fluid flow through the fluid pathway without the need for physical intervention into the wellbore. This can be accomplished by delivering pressurized fluid into the wellbore to act on the actuable device so to permit fluid flow between the fluid pathway and the wellbore interior. In such circumstances, the well screen assembly may comprise a valve (e.g., a check valve or other one-way valve) to prevent fluid loss into the formation due to the pressure differential created by the pressurized fluid. In some cases, a check valve may be used that at least partially remains in the flow path during production. As a result, the check valve remaining in the flow path may interfere with production flow. Accordingly, an integrated valve may be used that, upon production, is at least partially removed from the fluid pathway and thus does not interfere with production flow.

As disclosed herein, the integrated valve assembly incorporated in a production sleeve assembly for use in a wellbore may control fluid communication between the wellbore exterior and the wellbore tubular interior. The production sleeve assembly may comprise a chamber, a flow control device, and a fluid pathway providing fluid flow between the chamber and the wellbore tubular interior via an opening. The integrated valve assembly can comprise an actuable device disposed within the opening. The production sleeve assembly can be installed in the well with the actuable device in its unactuated configuration. In this configuration, fluid may be substantially prevented from flowing through fluid pathway. Once the actuable device has been actuated, fluid flow through the opening may be allowed. Fluid loss from wellbore tubular interior to the formation is prevented by an integrated valve, which is part of the integrated valve assembly. The integrated valve may comprise a valve seat and a valve plug. The integrated valve is structurally integrated with the fluid pathway such that, upon production, the plug becomes disengaged and travels at least partially into the wellbore tubular interior. Since the plug becomes at least partially cleared from the fluid pathway, fluid is permitted to flow through the fluid pathway unobstructed by the plug. Thus, the integrated valve facilitates set-up of the production assembly without leaving behind structures that may impair fluid flow through the production sleeve.

Various configurations of the integrated valve assembly are possible. In some embodiments, the valve seat is integrated within the fluid pathway such that it serves as a valve seat while the plug engages therewith, and later as a flow restrictor (e.g., a nozzle) when fluid flows therethough. In some embodiments, the plug engages the valve seat such that, upon production, the plug is released and travels completely into the wellbore tubular interior, thereby providing a fluid pathway unobstructed by the plug. In some embodiments, the plug can be at least partially dissolvable upon contact with the fluid so upon production, the plug dissolves and thus leaves the fluid pathway unobstructed.

The integrated valve can be incorporated into a production sleeve with an actuable device and disposed in series with a flow restriction. In some embodiments, the production sleeve can comprise a check valve in series with a flow restriction and one or more integrated valves in parallel with the check valve, thereby providing the ability to test well conditions and select an appropriate flow path based on such testing. In some embodiments, the production sleeve can comprise a check valve in series with a flow restriction and one or more integrated valves in parallel with the check valve, thereby providing the option to decrease the resistance of the flow path by bypassing the restriction device.

The integrated valve assembly can be incorporated into various embodiments of well system configurations. In some embodiments, a plurality of well screen assemblies each comprises a check valve, and one well screen assembly comprises an integrated valve. In other embodiments, each well screen assembly, in a string of well screen assemblies, comprises an integrated valve assembly. In other embodiments, a string of well screen assemblies may comprise various configurations incorporating check valves and integrated valve assemblies to provide for opening, enlarging, and/or bypassing one or more flow paths. Thus, the integrated valve assembly disclosed herein provides selective adjustment of a fluid pathway without removing a flow restriction disposed in the fluid pathway. Furthermore, the integrated valve assembly provides for an unobstructed fluid flow path.

Referring to FIG. 1, shown is an example of a wellbore operating environment, which may support the use of a flow control device comprising an integrated valve assembly. As depicted, the operating environment comprises a workover and/or drilling rig 100 that is positioned on the earth's surface and extends over and around a wellbore 101 that penetrates a subterranean formation for the purpose of recovering hydrocarbons. The wellbore 101 may be drilled into the subterranean formation 103 using any suitable drilling technique. The wellbore 101 extends substantially vertically away from the earth's surface over a vertical wellbore portion 101a, deviates from vertical relative to the earth's surface over a deviated wellbore portion 101b, and transitions to a horizontal wellbore portion 101c. In alternative operating environments, all or portions of a wellbore 101 may be vertical, deviated at any suitable angle, horizontal, and/or curved. The wellbore 101 may be a new wellbore, an existing wellbore, a straight wellbore, an extended reach wellbore, a sidetracked wellbore, a multi-lateral wellbore, and other types of wellbores for drilling and completing one or more production zones. Further, the wellbore 101 may be used for both producing wells and injection wells.

A wellbore tubular string 102 may be lowered into the subterranean formation 103 for a variety of drilling, completion, workover, treatment, and/or production processes throughout the life of the wellbore. The embodiment shown in FIG. 1 illustrates the wellbore tubular 102 in the form of a completion assembly string disposed in the wellbore. It should be understood that the wellbore tubular 102 is equally applicable to any type of wellbore tubulars being inserted into a wellbore including as non-limiting examples drill pipe, casing, liners, jointed tubing, and/or coiled tubing. Further, the wellbore tubular may operate in any of the wellbore orientations (e.g., vertical, deviated, horizontal, and/or curved) and/or types described herein. In an embodiment, the wellbore 101 may comprise wellbore casing, which may be cemented into place in the wellbore.

In an embodiment, the wellbore tubular string 102 may comprise a completion assembly string comprising one or more wellbore tubular types and one or more downhole tools (e.g., zonal isolation devices, screens, production sleeve, valves, etc.). The one or more downhole tools may take various forms. For example, a zonal isolation device 106 may be used to isolate the various zones within a wellbore and may include, but is not limited to, a packer (e.g., production packer, gravel pack packer, frac-pac packer, etc.). In an embodiment, the wellbore tubular string 102 may comprise a plurality of well screen assemblies 104, which may be disposed within the horizontal wellbore portion. The zonal isolation devices 106, may be used between various ones of the well screen assemblies, for example, to isolate different zones or intervals along the wellbore from each other.

The workover and/or drilling rig 100 may comprise a derrick with a rig floor through which the wellbore tubular 102 extends downward from the drilling rig 100 into the wellbore 101. The workover and/or drilling rig 100 may comprise a motor driven winch and other associated equipment for conveying the wellbore tubular 102 into the wellbore 101 to position the wellbore tubular 102 at a selected depth. While the operating environment depicted in FIG. 1 refers to a stationary workover and/or drilling rig for conveying the wellbore tubular within a land-based wellbore, in alternative embodiments, mobile workover rigs, wellbore servicing units (such as coiled tubing units), and the like may be used to convey the wellbore tubular 102 within the wellbore 101. It should be understood that a wellbore tubular 102 may alternatively be used in other operational environments, such as within an offshore wellbore operational environment.

Referring next to FIGS. 2A, 2B, and 2C, therein is depicted a fluid flow control device 200 incorporating an integrated valve 215 according to the present invention. Fluid flow control device 200 may be suitably coupled to other similar fluid flow control devices, seal assemblies, production tubulars or other downhole tools to form a tubing string as described above. Fluid flow control device 200 includes a sand control screen section 201 and a flow restrictor section 202. Sand control screen section 201 includes a suitable sand control screen element or filter element. The filter element is used to separate at least a portion of any sand and/or other debris from a fluid that generally flows from an exterior to an interior of the screen assembly. The filter element may be of the type known as "wire-wrapped," which is made up of a wire closely wrapped helically about a wellbore tubular, with a spacing between the wire wraps being chosen to keep sand and the like that is greater than a selected size from passing between the wire wraps. Other types of filters (such as sintered, mesh, pre-packed, expandable, slotted, perforated, etc.) may also be used. The filter element may also comprise one or more layers of the filter material. The flow path can be disposed between the filter portion and the wellbore tubular to allow a fluid passing through the filter portion to flow along the outer surface of the wellbore and into the flow control device. In the illustrated embodiments, a protective outer shroud 203 having a plurality of perforations 204 may be positioned around the exterior of the filter medium.

Flow restriction section 202 may comprise a first end comprising an access port 210 in fluid communication with the sand control screen section 201. Flow restriction section 202 may comprise a flow restriction 205 generally disposed within fluid pathway 206 between the access port 210 and the one or more openings 207. The flow restriction 205 is configured to provide a desired resistance to fluid flow through the flow restriction 205. The flow restriction 205 may be selected to provide a resistance for balancing the production along an interval. Various types of flow restrictions can be used with the flow control device described herein. In the embodiment shown in FIGS. 2A, 2B, and 2C, the flow restriction 205 comprises a nozzle that comprises a central opening (e.g., an orifice) configured to cause a specified resistance and pressure drop in a fluid flowing through the flow restriction. The central opening 208 may have a variety of configurations from a rounded cross-section, to a cross-section in which one or more of the first edge or the second edge comprises a sharp-squared edge. In general, the use of a squared edge at either the first edge and/or the second edge may result in a greater pressure drop through the orifice than other shapes. Further, the use of a squared edge may result in a pressure drop through the flow restrictor that depends on the viscosity of the fluid passing through the flow restriction. The use of a squared edge may result in a greater pressure drop through the flow restrictor for an aqueous fluid than a hydrocarbon fluid, thereby presenting a greater resistance to flow for any water being produced relative to any hydrocarbons (e.g., oil) being produced. Thus, the use of a central opening comprising a squared edge may advantageously resist the flow of water as compared to the flow of hydrocarbons. In some embodiments described herein, a plurality of nozzle type flow restrictions may be used in series.

The flow restriction 205 may also comprise one or more restrictor tubes. The restrictor tubes generally comprise tubular sections with a plurality of internal restrictions (e.g., orifices). The internal restrictions are configured to present the greatest resistance to flow through the restrictor tube. The restrictor tubes may generally have cylindrical cross-sections, though other cross-sectional shapes are possible. The restrictor tubes may be disposed within the fluid pathway with the fluid passing through the interior of the restrictor tubes, and the restrictor tubes may generally be aligned with the longitudinal axis of the wellbore tubular within the fluid pathway. The plurality of internal restrictions may then provide the specified resistance to flow.

Other suitable flow restrictions may also be used including, but not limited to, narrow flow tubes, annular passages, bent tube flow restrictors, helical tubes, and the like. Narrow flow tubes may comprise any tube having a ratio of length to diameter of greater than about 2.5 and providing for the desired resistance to flow. Similarly, annular passages comprise narrow flow passages that provide a resistance to flow due to frictional forces imposed by surfaces of the fluid pathway. A bent tube flow restrictor comprises a tubular structure that forces fluid to change direction as it enters and flows through the flow restrictor. Similarly, a helical tube flow restrictor comprises a fluid pathway that forces the fluid to follow a helical flow path as it flows through the flow restrictor. The repeated change of momentum of the fluid through the bent tube and/or helical tube flow restrictors increases the resistance to flow and can allow for the use of a larger flow passage that may not clog as easily as the narrow flow passages of the narrow flow tubes and/or annular passages. Each of these different flow restriction types may be used to provide a desired resistance to flow and/or pressure drop for a fluid flow through the flow restrictor. Since the resistance to flow may change based on the type of fluid, the type of flow restriction may be selected to provide the desired resistance to flow for one or more type of fluid.

The flow restriction 205 can be subject to erosion and/or abrasion from fluids passing through the flow restriction. Accordingly, the flow restriction 205, or at least those portions contacting the fluid flow can be formed from any suitable erosion and/or abrasion resistant materials. Suitable materials may comprise various hard materials such as various steels, tungsten, niobium, vanadium, molybdenum, silicon, titanium, tantalum, zirconium, chromium, yttrium, boron, carbides (e.g., tungsten carbide, silicon carbide, boron carbide), nitrides (e.g., silicon nitride, boron nitride), oxides, silicides, alloys thereof, and any combinations thereof. In an embodiment, one or more of these hard materials may form a portion of a composite material. For example, the hard materials may form a particulate or discontinuous phase useful in resisting erosion and/or abrasion, and a matrix material may bind the hard particulate phase. Suitable matrix materials may comprise copper, nickel, iron, cobalt, alloys thereof, and any combination thereof. Since machining hard, abrasion, erosion and/or wear resistant materials is generally both difficult and expensive, the flow restrictions may be formed from a metal in a desired configuration and subsequently one or more portions of the flow restriction may be treated to provide the desired abrasion, erosion and/or wear resistance. Suitable surface treatments used to provide erosion and/or abrasion resistance can include, but are not limited to, carburizing, nitriding, heat treating, and any combination thereof. In embodiments in which erosion and/or abrasion is not a concern, additional suitable materials such as various polymers may also be used.

Returning to the embodiment of FIGS. 2A, 2B, and 2C, the flow restriction 205 may be fixedly engaged within the fluid pathway 206. For example, the flow restriction 205 may be press fitted, snap fitted, shrunk-fit, bonded (e.g., adhered, soldered, welded, brazed, etc.), and/or integrally formed with the housing 209 so as to not be removable from the housing. In some contexts this may be referred to as being permanently installed within the housing 209. In an embodiment in which multiple fluid pathways are disposed in the housing about the wellbore tubular, one or more flow restrictions may be disposed in each fluid pathway. The design and type of flow restriction 205 may change for each of the one or more flow restrictions disposed in each fluid pathway. For example, the type of flow restrictions in each fluid pathway may each be the same or different.

In an embodiment, the design of each of the one or more flow restrictions 205 disposed in each fluid pathway may also be the same or different. In an embodiment as shown in FIGS. 2A, 2B, and 2C, where the flow restriction 205 comprises a nozzle type flow restriction, the configuration (e.g., size, cross-sectional shape, etc.) of the central opening 208 may determine the resistance to flow and pressure drop through each flow restriction 205. Each of the flow restrictions disposed in each fluid pathway may have a differently sized central opening, thereby providing some flow restrictions with a lower resistance to flow (e.g., using larger central openings) than other flow restrictions with a higher resistance to flow (e.g., using smaller central openings). A combination of flow restrictions comprising large openings and flow restrictions comprising small openings may then be used to provide a desired total flow resistance and/or flow rate through the flow control device. It should be appreciated that many various numbers of different sized openings may be provided, and in an embodiment, each flow restriction 205 may have a differently sized restriction. Further, one or more additional flow restrictions 205 may be disposed in line with the flow restrictions. In an embodiment, the total or overall flow rate and resistance to flow through the flow control device may be a function of the combination of each of the individual flow rates and resistances as provided by the plurality of flow restrictions disposed in the plurality of fluid pathways. The ability to use combinations of flow restrictions having different resistances to fluid flow may allow a wide range of total flow rates and resistances to flow to be selected for a given flow control device, thereby providing for the ability to balance production along an interval.

In the embodiment depicted in FIG. 2A, an actuable device 211 may be disposed within an opening 207 and in series with one or more flow restrictions 205 in the tubular interior flow path 212. In certain embodiments, the actuable device 211 may be a pressure actuated device that is actuated responsive to an increase in pressure at or above a predetermined level in the interior flow path 212. For example, the actuable device 211 may be a rupture disk, burst disk, or shear pin that provides for one-time use. In the case of a rupture disk, a membrane or actuable disk of the rupture disk can be engineered to fail at a predetermined pressure differential threshold across the actuable disk such that exposing the actuable disk to a pressure differential at or above the threshold opens the fluid pathway that was blocked by the rupture disk. Use of such a rupture disk enables a single opening event and may not allow for resealing without replacing the actuable device. It should be noted, however, by those skilled in the art that other types of actuable devices may alternatively be used, such devices including, but not limited to, valves, sliding sleeves, removable plugs and the like. In addition, other methods of actuating a device or otherwise establishing communication through the base pipe can be used including, but not limited to, hydraulic control systems, electrical actuators, punch tools and the like. As shown in FIG. 2C, once actuable device 211 has been actuated, fluid flow through opening 207 may be allowed. Accordingly, fluid flow control device 200 may be operated from a no flow configuration (shown in FIG. 2A) to a flow enabled configuration (shown in FIG. 2C) by actuating the actuable device 211.

An integrated valve 215 may be disposed within the housing 209 and may form, together with the actuable device 211, an integrated valve assembly. In an embodiment, the integrated valve 215 comprises a plug 213 component and a valve seat 214 component adjacent the opening 207. The valve seat 214 component may form a portion of an opening 216 (e.g., an orifice) that is integrated within the fluid pathway 206 such that it serves as a valve seat while the plug 213 engages therewith (depicted in FIG. 2B), and later as a flow restrictor (e.g., an orifice type flow restrictor, a nozzle type flow restrictor, a narrow tube, etc.) when fluid flows therethrough (depicted in FIG. 2C). The plug 213 may be configured to engage with the valve seat 214 such that the plug 213 at least partially blocks the opening 216. As a result, the engagement of the valve 215 prevents fluid loss into the formation 103 when pressure within interior flow path 212 exceeds that of the formation 103, for example during actuation of the actuable device 211.

As shown in FIGS. 2A, 2B, and 2C, an integrated valve 215 can comprise a plug 213 shaped as a ball, which engages the valve seat 214 by becoming seated therein. However, those skilled in the art will recognize that other types of plugs may be used. For example, the plug 213 can comprise a temporary plug that sealingly engages the valve seat 214. In such configuration, the plug 213 can include a weep hole therethrough to allow a pressure differential to form across the actuable device and thus enable actuation thereof.

In operation, fluid flow control device 200 is installed within the well with the actuable device 211 in its unactuated configuration (as shown in FIG. 2A). In this configuration, substantially no fluid is able to flow through fluid flow control device 200. Upon actuation, the pressurized fluid within the interior flow path 212 may create a pressure differential across the actuable device 211 above a threshold, thereby causing its actuable device 211 to fail. The actuation of the actuable device 211 thus permits fluid flow through the opening 207. Upon actuation of the actuable device 211, when the pressure within the interior flow path 212 exceeds that within the fluid flow control device 200, the plug 213 becomes engaged (e.g., sealingly engaged) in the valve seat 214, thereby preventing fluid loss into the formation 103. When the pressure within the fluid flow control device 200 exceeds that within the interior flow path 212 (e.g., during production), the plug 213 can be released from valve seat 214 (as depicted in FIG. 2C). As can be seen from FIGS. 2A-2C, the plug 213 may be configured to travel from the valve seat 214 at least partially through the opening 207 and into the interior flow path 212. In an embodiment, upon production the plug 213 is entirely released through the opening 207. Since the plug 213 completely clears the fluid pathway, the fluid may be allowed to travel to the interior flow path 212 unobstructed by the plug 213.

Referring next to FIGS. 3A, 3B, and 3C, therein is depicted an embodiment wherein at least one component of the integrated valve assembly 211, 313, 214 at least partially dissolves or erodes. In some embodiments, a component may dissolve upon contact with a fluid, such as a hydrocarbon fluid, an aqueous fluid, and/or a solvent. In some embodiments, a component may erode throughout exposure to materials, such as an abrasive or erosive material in a fluid (e.g., sand or proppant in a fluid). In the particular embodiment illustrated in FIGS. 3A, 3B, and 3C, the at least one component of the integrated valve assembly 211, 313, 214 that dissolves or erodes comprises a plug 313 that dissolves upon contact with a hydrocarbon fluid.

A dissolving or eroding plug 313 may provide various benefits. For example, the ability to dissolve may serve as a precautionary feature to ensure the plug 313 is released from the fluid flow control device 300. Thus, even when the plug 313 is dimensioned to pass through the opening 207, in an event where the plug 313 does not make its way out from within the housing 209, the plug 313 may at least partially dissolve upon contact with the fluid. As another example, the ability to dissolve or erode may serve to maintain the interior flow path 212 clear of obstructions or at least with a reduced amount of obstructions. In such cases, even when the plug 313 successfully passes through the opening 207, the plug 313 may dissolve or erode within the interior flow path 212, which may limit the amount of debris in the wellbore. As another example, and as depicted in FIGS. 3A-3C, the ability to dissolve provides a plug 313 with the capability to change its size according to its functionality. For example, those skilled in the art can appreciate that if the actuation of the actuable device requires a substantially high pressure, then a relatively small sized actuable device 211 may be used. However, it may be beneficial to include a larger valve seat/nozzle 214 for an effective flow path during production. By configuring the plug 313 to dissolve, the plug 313 can be large enough to engage the valve seat 214 during actuation of the device (as shown in FIG. 3B), and later decrease in size in order to travel through the opening 207 subsequent actuation of actuable device 211 (as shown in FIG. 3C).

Other features of the integrated valve 211, 313, 214, besides or in addition to the plug 313, may dissolve or erode. For example, the valve seat 214 may dissolve or erode. Since the valve seat 214 serves as a valve seat while the plug 313 engages therewith, and may later serve as a nozzle when fluid flows through the opening 216, its dimensions may be altered according to its changing functionality. For example, when valve seat 214 operates as a valve seat, the opening 216 may be dimensioned small enough to maintain a sealing engagement with the plug 313. Upon production, however, the valve seat 214 may serve as a nozzle and the valve seat 214 may dissolve or erode so that the size of the opening 216 increases in size fluid flow, thereby facilitating fluid flow therethrough.

Additionally, one or more portions of the actuable device 211 may be configured to dissolve or erode, which can serve various beneficial outcomes. For example, a dissolving or eroding actuable device 211 may serve as a precautionary feature to ensure that the plug 313 is successfully released from the fluid flow control device 300. Therefore, in the event that the pressurized fluid does not succeed in fully actuating the actuable device 211, the actuable device 211 may at least partially dissolve or erode, thereby releasing the plug 313 into the interior flow path 212. As another example, the ability of the actual device 211 to dissolve or erode may serve to limit the amount of debris within the interior flow path 212. Thus, even if the actuable device 211 clears the opening 207 without the need to dissolve or erode, it may travel to the interior flow path 212 where it dissolves or erodes therein. As a result, the dissolving or eroding capability may prevent contamination of the interior flow path 212.

As another example, an actuable device 211 may dissolve or erode in order to provide an opening 207 that enlarges over time. In such case, actuation of the actuable device 211 may allow the plug 313 to travel into the interior flow path 212. However, a portion of the actuable device 211 may endure the actuation and remain within the opening 207, thereby providing the opening 207 with a first dimension. Afterwards, the remaining portion of the actuable device 211 may dissolve or erode, thereby providing the opening 207 with a second, larger dimension. As a result, the flow path through the opening 207 increases throughout the life of the assembly, providing a choked flow rate at the beginning of production and providing an increasing flow rate thereafter.

Figure 4:
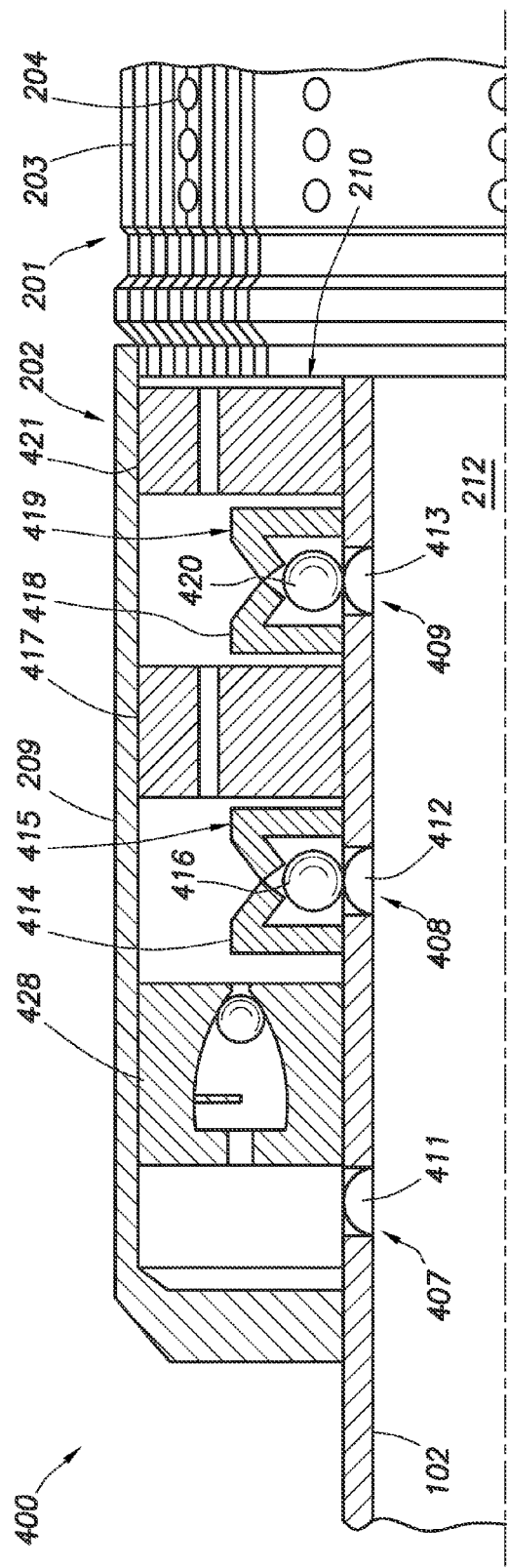
FIG. 4 is a partial cross-sectional view of a well screen assembly comprising still another embodiment of a fluid flow control device.

In an embodiment of fluid flow control device 400, as shown in FIG. 4, a check valve 428 may be disposed in series with a flow restriction 417, and a first integrated valve 414, 416 and at least one second integrated valve 418, 420 may be disposed in parallel with the check valve 428. In the FIG. 4 embodiment, actuable devices 411, 412, 413 are in series with the check valve 428 and with each integrated valve. For example, each actuable device may actuate at a different pressure differential 414, 416 & 418, 420. By way of example only, the first actuable device 411 in series with the check valve may fail at a first pressure differential (e.g., 1,000 psi), the second actuable device 412 in series with the first integrated valve 414, 416 may fail at a second pressure differential (e.g., 2,000 psi), and the third actuable device 413 in series with the second integrated valve 418, 420 may fail at a third pressure differential (e.g., 3,000 psi); wherein the second pressure differential is greater than the first pressure differential, and the third pressure differential is greater than the second pressure differential.

In operation, the check valve provides means for testing the conditions within the assembly so the user can determine the appropriate flow path configuration and open fluid pathways accordingly. For example, the user may provide 1,000 psi of fluid pressure differential across the first actuable device to actuate the first actuable device and test the conditions within the assembly. If, upon testing, the user determines the appropriate fluid pathway is one requiring a higher fluid resistance, then at least 2,000 psi of fluid pressure differential can be delivered downstream to actuate the second actuable device and not actuate the third actuable device. Alternatively, if, upon testing, the user determines the appropriate fluid pathway is one requiring a lower fluid resistance, then at least 3,000 psi of fluid pressure differential can be delivered downstream to open both the second and the third openings. As is apparent to one of ordinary skill in the art, the assembly can comprise various arrangements comprising various quantities and/or types of check valves and integrated valve structures.

Figure 5A:
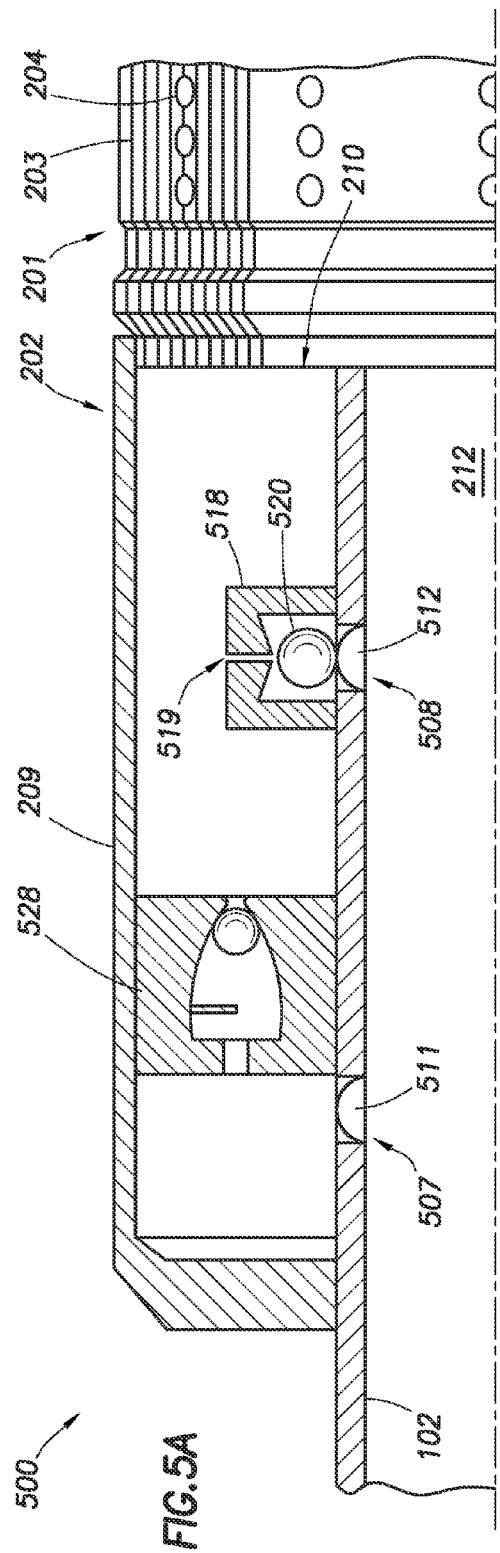
FIGS. 5A and 5B are partial cross-sectional views of a well screen assembly comprising still another embodiment of a fluid flow control device.
Figure 5B:
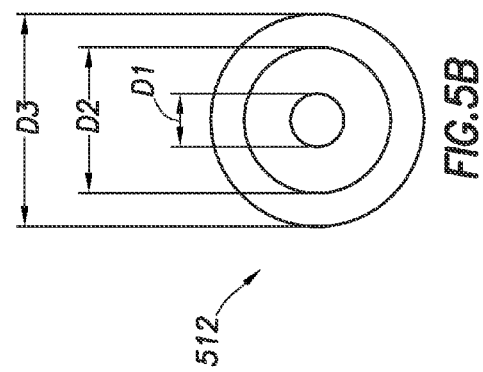

Referring next to FIGS. 5A and 5B, therein depicted is an embodiment of fluid flow control device 500 comprising a check valve 528 in series with a first actuable device 511, and an integrated valve 215 in series with a second actuable device 512. The second actuable device 512 comprises a different actuation threshold, which may be greater or less than the actuation threshold of the first actuable device 511. Also, the actuation threshold for the second actuable device 512 may increase at larger diameters. For example, as illustrated in FIGS. 5A and 5B, the first actuable device 511 can be configured to actuate at about a 1,000 psi pressure differential; while the second actuable device 512 has a first diameter D1 configured to actuate at about a 2,000 psi pressure differential, has a second diameter D2 configured to actuate at about a 3,000 psi pressure differential; and has a third diameter D3 configured to fail at about 4,000 psi pressure differential.

In an embodiment, the check valve 528 may provide a means for testing the conditions within the wellbore 101, which may allow for the determination the appropriate flow path configuration. For example, the user may provide 1,000 psi of fluid pressure differential across the first actuable device 511 to actuate the first actuable device 511 and test the conditions within wellbore 101. If, upon testing, the user determines the appropriate fluid pathway is one requiring a higher fluid resistance, about 2,000 psi of fluid pressure differential can be delivered downstream to actuate second actuable device at the second diameter D2 and thus create a smaller opening. Alternatively, if upon testing, the user determines the appropriate fluid pathway is one requiring lower fluid resistance, about 4,000 psi of fluid pressure differential can be delivered to actuate the second actuable device at the third diameter D3 and thus create a larger opening.

As shown in FIG. 5A, in some embodiments flow restriction 519 may be configured integrally with the integrated valve seat 518. In other embodiments, flow restriction may be configured as a separate unit and in series with the integrated valve seat and nozzle. Such incorporation between the integrated valve and the flow restriction may apply to any of the various embodiments of the current disclosure.

Figure 6:
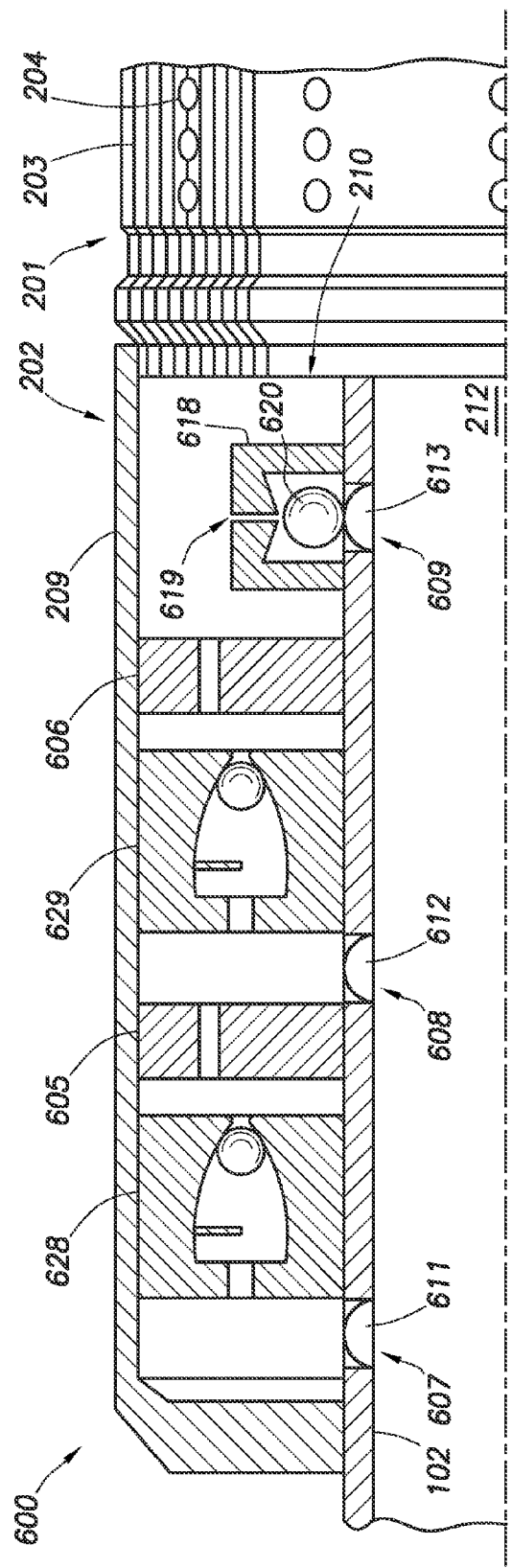
FIG. 6 is a partial cross-sectional view of a well screen assembly comprising still another embodiment of a fluid flow control device.

Over the life of the well, it may become desirable to change the resistance to flow associated with the fluid flow path. In such circumstances, the user may selectively tailor the flow path resistance by altering the flow path configuration during production. Referring now to FIG. 6, therein depicted is an embodiment of a fluid flow control device 600 comprising one or more check valves 628, 629 in series with a flow restrictions 605, 606, and one or more integrated valves 618 in parallel with the flow restrictions 605, 606. More particularly, FIG. 6 illustrates an embodiment comprising two checkvalves 628, 629 each in series with first and second flow restriction 605 606, and one integrated valve 618 in parallel with both the first and second flow restrictions 605, 606. The first actuable device 611 is in series with the first check valve 628 and is configured to actuate at a first pressure differential (e.g., 1,000 psi), the second actuable device 612 is in series with the second check valve 629 and is configured to actuate at a second pressure differential (e.g., 2,000 psi), and the third actuable device 613 is in series with the integrated valve 618 and is configured to actuate at a third pressure differential (e.g., 3,000 psi), wherein the second pressure differential is greater than the first pressure differential, and the third pressure differential is greater than the second pressure differential.

In operation, the first pressure differential (e.g., 1,000 psi) may be delivered to the system, thereby rupturing the first actuable device 611 and creating a flow path through both first and second flow restrictions 605, 606. At a later time, when it becomes desirable to increase the flow, the fluid pressure differential may again be increased above the second pressure differential (e.g., 2,000 psi). Consequently, the second actuable device 612 will rupture, creating a flow path through the second restriction device 606 and substantially bypassing the first flow restriction 605. Subsequently, the third pressure differential (e.g., 3,000 psi) may be delivered to rupture the third actuable device 613. Thus, both the first and second flow restrictions 605, 606 will be bypassed and the fluid will flow through opening in the valve seat 619. As seen in FIG. 6, the third actuable device is in series with integrated valve 618. As a result, upon production, the fluid flow path will become at least partially unobstructed by the plug 620.

Referring now to FIGS. 7A and 7B, shown are exemplary well systems 700, 800 intended to illustrate the various configurations in which to possibly incorporate the integrated valve assembly. The system may comprise a plurality of well screen assemblies comprising various configurations. The well screen assemblies may each be configured so to provide an appropriate pressure drop, according to their placement in the wellbore and according to other conditions affecting fluid flow. Thus, within a system comprising a plurality of well screen assemblies, some of the assemblies may provide a large pressure drop while other assemblies may be closed, open or provide a lower pressure drop. In an embodiment, some of the assemblies may allow the user to selectively adjust the flow resistance by altering the flow path configuration.

Turning now to FIG. 7A, therein depicted is an embodiment comprising a plurality of well screen assemblies 701, 702, and 703, each comprising a check valve 728, 729, and 730 in series with a restriction device 721, 722, and 723 and an actuable device 717, 718, and 719, and a well screen assembly 704 comprising an integrated valve 215 in series with a restriction device 724 and an actuable device 720. The plurality of well screen assemblies is configured such that the well screen assembly 704 comprising the integrated valve 215 also comprises the actuable device 720 with the highest actuation threshold. For example, the actuable devices may be rupture disks. In such an embodiment, first actuable device 717 may actuate at a first actuation threshold (e.g., about a 1,000 psi pressure differential), the second actuable device 718 may actuate at a second actuation threshold (e.g., at about a 2,000 psi pressure differential), the third actuable device 719 may actuate at a third actuation threshold (e.g., at about a 3,000 psi pressure differential), and a fourth actuable device 720 may actuate at a fourth actuation threshold (e.g., at about a 4,000 psi pressure differential).

In operation, the first actuation threshold (e.g., about a 1,000 psi pressure differential) may be delivered to the system, thereby actuating the first rupture disk 717 and creating a flow path through the first well screen assembly 701. At a later time, when it becomes desirable to increase the fluid flow, the second actuation threshold may be delivered to the system (e.g., about a 2,000 psi pressure differential). Consequently, the second rupture disk 718 may actuate, creating a flow path through both the first 701 and the second 702 well screen assemblies. This same process may be repeated to actuate the third rupture disk 719. At a subsequent time, the fourth actuation threshold (e.g., about a 4,000 psi pressure differential) may be delivered to actuate the fourth rupture disk 720. Thus, fluid communication may be established through fluid pathway. As seen in FIG. 7A, the fourth rupture disk 720 is in series with an integrated valve 215. As a result, upon production through well screen assembly, the fluid flow path may become at least partially unobstructed by the plug 213. Therefore, the integrated valve 215 may provide an at least partially unobstructed flow path at the time when improving the flow rate is desired.

Turning to FIG. 7B, therein depicted is an embodiment of a plurality of well screen assemblies 801, 802, and 803, wherein each well screen assembly 801, 802, and 803 comprises an integrated valve 843, 848 & 844, 849 & 845, 850 in series with a restriction device 828, 851, 852 and an actuable device 818, 819, 820. The actuable devices 818, 819, 820 may each be rupture disks that actuate upon the delivery of the same or similar actuation threshold thereto. In operation, the user may deliver the actuation threshold (e.g., a common pressure differential), thereby rupturing all of the rupture disks 818, 819, 820. Because each integrated valve 843, 848 & 844, 849 & 845, 850 is directly proximate the corresponding opening 860-862, the engagement of the plugs 843-845 with the valve seats 848-850 during actuation of actuable devices 818-820 ensures that the pressure of the fluid is preserved along the wellbore tubular string. As a result, the system facilitates the actuation of numerous actuable devices 818-820 along one or more portions of a wellbore tubular string using a single actuation threshold. Furthermore, the integrated valves 843, 848 & 844, 849 & 845, 850 may provide an at least partially unobstructed flow path upon production.

In operation, the fluid flow control device may be installed within the well with each actuable device in its unactuated configuration. In this configuration, fluid communication through the fluid pathway may be prevented. To enable fluid communication through fluid flow path, the wellbore tubular interior may be pressurized to create a first pressure, wherein the first pressure is greater than a second pressure in an exterior of the wellbore tubular. Such pressurization creates a pressure differential across an actuable device disposed in the fluid pathway between the exterior of the wellbore tubular and the interior of the wellbore tubular. When the pressure differential is at or above a pressure differential threshold, the actuable device may be actuated. In order to maintain the first pressure within the wellbore tubular interior, the plug releasably engages a valve seat in the fluid pathway. Such engagement between plug and valve seat may also prevent fluid loss into the formation.

Subsequent to the actuation of the actuable device, the pressure within the wellbore tubular interior may decrease such that the pressure within the wellbore tubular interior is less than the pressure within the wellbore exterior. As a result, fluid may flow from the wellbore exterior to the wellbore tubular interior via fluid pathway. The plug that is engaged with the seat may be released from the valve seat in response to the fluid flow from the formation to the interior of the wellbore tubular. The plug, valve seat, actuable device, and opening may be configured such that, upon release of the plug, the plug disengages the valve seat and travels at least partially through the opening into the wellbore tubular interior. Since the plug at least partially clears the fluid pathway, the fluid produces at least partially unobstructed by the plug.

The valve seat may be integrated with the fluid pathway such that it functions as a valve seat when the plug engages therewith and later, upon production, it functions as a flow restrictor (e.g., a nozzle) for the fluid to flow therethrough. The flow restrictor configuration may comprise a central opening (e.g., an orifice) that is integrated within the fluid pathway such that it causes a specified resistance and pressure drop in the fluid flowing through the flow restrictor.

It may be desirable to decrease the pressure drop created by the flow restrictors over time to account for the decline in reservoir pressure due to depletion of the reservoir. Accordingly, the valve seat/nozzle may be at least partially erodible. In this embodiment, as the valve seat/nozzle erodes, the orifice expands, thereby decreasing the pressure drop in the fluid flowing through the flow restrictor. Accordingly, by establishing a fluid pathway that gradually decreases its resistance, this embodiment allows for the progressive reduction in the pressure drop experienced by fluids passing therethrough.

Having described various systems and methods herein, various embodiments may include, but are not limited to:

In a first embodiment, a production sleeve assembly for use downhole comprises a fluid pathway configured to provide fluid communication between an exterior of a wellbore tubular and an interior of the wellbore tubular through a chamber, a flow restriction disposed in the fluid pathway, and a valve disposed in series with the flow restriction in the fluid pathway. The valve comprises a rupture disk, and a plug releasably engaged in the fluid pathway in series with the rupture disk. The valve is configured to allow production from the exterior of the wellbore tubular to the interior of the wellbore tubular through the chamber without producing past the plug once the rupture disk is actuated. In a second embodiment, the flow restriction of the first embodiment may comprise at least one of an inflow control device or an autonomous inflow control device. In a third embodiment, the plug of the first or second embodiment may comprise a ball. In a fourth embodiment, the valve of any of the first to third embodiments may be configured to release the plug when the rupture disk is ruptured and the pressure within the exterior of the wellbore tubular is greater than the pressure within the interior of the wellbore tubular. In a fifth embodiment, the plug of any of the first to fourth embodiments may be configured to at least partially disintegrate or at least partially dissolve in response to a fluid flow through the chamber. In a sixth embodiment, the rupture disk of any of the first to fifth embodiments may comprise a frangible material. In a seventh embodiment, the assembly of any of the first to sixth embodiments may also include a seat, and the plug may sealingly engage the seat. In an eighth embodiment, the seat, the chamber, and the plug of the seventh embodiment may comprise a ball type check valve. In a ninth embodiment, the seat of the seventh or eighth embodiments may comprise a weep hole, and the weep hole may be configured to provide choked fluid communication past the plug. In a tenth embodiment, the seat of any of the seventh to ninth embodiments may comprise a portion of the flow restriction. In an eleventh embodiment, the seat of any of the seventh to tenth embodiments may be configured to at least partially erode in response to a production flow from the exterior of the wellbore tubular into the interior of the wellbore tubular.

In a twelfth embodiment, a production string for use downhole comprises a housing disposed about a wellbore tubular, a chamber formed between the housing and the wellbore tubular, a flow restriction disposed in the chamber, and a valve disposed in a fluid pathway between the chamber and an interior of the wellbore tubular. The valve comprises: a rupture disk, and a plug disposed adjacent the rupture disk. The valve is configured to substantially block fluid flow between the interior of the wellbore tubular and the chamber in a first state, substantially prevent fluid flow from the interior of the wellbore tubular into the chamber in a second state, and allow fluid flow between the chamber and the interior of the wellbore tubular in a third state. In a thirteenth embodiment, the valve of the twelfth embodiment may be configured to transition from the first state to the third state in response to a pressure increase in the interior of the wellbore tubular. In a fourteenth embodiment, the valve of the twelfth or thirteenth embodiments may be in series with the flow restriction. In a fifteenth embodiment, the production string of the fourteenth embodiment may also include at least one one-way valve in series with the flow restriction, and the at least one one-way valve may be configured to allow fluid flow from the exterior of the wellbore tubular to the interior of the wellbore tubular while substantially preventing flow from the interior of the wellbore tubular to the exterior of the wellbore tubular. In a sixteenth embodiment, the production string of the twelfth or thirteenth embodiments may also include at least one one-way valve in series with the flow restriction, and the one-way valve may be configured to allow flow from the exterior of the wellbore tubular to the interior of the wellbore tubular while substantially preventing flow from the interior of the wellbore tubular to the exterior of the wellbore tubular, and the valve may be disposed in parallel with the flow restriction. In a seventeenth embodiment, the valve of the sixteenth embodiment may be configured to provide a flow path bypassing the flow restriction when the valve is in the third state. In an eighteenth embodiment, the production string of any of the twelfth to seventeenth embodiments may also include a filter media, and a fluid pathway into the chamber may pass through the filter media.

In a nineteenth embodiment, a method of changing the flow state of a production sleeve comprises pressurizing an interior of a wellbore tubular to a first pressure, wherein the first pressure is greater than a second pressure in an exterior of the wellbore tubular, actuating a rupture disk in response to the first pressure, maintaining the first pressure within the interior of the wellbore tubular using a plug, decreasing the pressure in the interior of the wellbore tubular below the second pressure, and establishing fluid communication between the exterior of the wellbore tubular and the interior of the wellbore tubular along the fluid pathway in response to the decreasing of the pressure in the interior of the wellbore tubular. The rupture disk is disposed in a fluid pathway between the exterior of a wellbore tubular and the interior of the wellbore tubular, and the plug is releasably engaged in the fluid pathway adjacent the rupture disk. In a twentieth embodiment, establishing fluid communication in the nineteenth embodiment may comprise establishing fluid communication through a flow restriction disposed in the fluid pathway. In a twenty first embodiment, the method of the nineteenth or twentieth embodiments may also include maintaining the first pressure within the interior of the wellbore tubular using one or more one-way valves, and bypassing a flow restriction. The one or more one-way valves may be configured to allow fluid flow from the exterior of the wellbore tubular to the interior of the wellbore tubular while substantially blocking flow from the interior of the wellbore tubular to the exterior of the wellbore tubular. In a twenty second embodiment, the method of any of the nineteenth to twenty first embodiments may also include actuating a second rupture disk in response to the first pressure, and establishing fluid communication between the exterior of the wellbore tubular and the interior of the wellbore tubular along the second fluid pathway in response to the decreasing of the pressure in the interior of the wellbore tubular. The second rupture disk may be disposed in a second fluid pathway between the exterior of the wellbore tubular and the interior of the wellbore tubular. In a twenty third embodiment, the method of any of the nineteenth to twenty first embodiments may also include actuating a second rupture disk in response to the first pressure, and the second rupture disk may be disposed in the fluid. In a twenty fourth embodiment, the plug of the nineteenth to twenty third embodiments may be releasably engaged with a seat in the fluid pathway. In a twenty fifth embodiment, the method of the twenty fourth embodiment may also include flowing a fluid from the exterior of the wellbore tubular to the interior of the wellbore tubular along the fluid pathway, and eroding at least a portion of the seat in response to the fluid flowing through the fluid pathway. In a twenty sixth embodiment, the seat of the twenty fourth or twenty fifth embodiments may comprise a portion of a flow restriction. In a twenty seventh embodiment, the method of any of the nineteenth to twenty fourth embodiments may also include flowing a fluid from the exterior of the wellbore tubular to the interior of the wellbore tubular along the fluid pathway, and eroding at least a portion of the plug in response to the fluid flowing through the fluid pathway. In a twenty eighth embodiment, the method of any of the nineteenth to twenty seventh embodiments may also include removing substantially the entire rupture disk from the fluid pathway in response to actuating the rupture disk.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A production sleeve assembly for use downhole comprising:
   a fluid pathway configured to provide fluid communication between an exterior of a wellbore tubular and an interior of the wellbore tubular through a chamber;
   a flow restriction disposed in the fluid pathway parallel to the axis of the wellbore tubular; and
   a valve disposed in series with the flow restriction in the fluid pathway, wherein
   the valve comprises:
   a rupture disk; and
   a plug releasably engaged in the fluid pathway in series with the rupture disk, wherein the valve is configured to allow production from the exterior of the wellbore tubular to the interior of the wellbore tubular through the chamber and past the plug once the rupture disk is actuated; wherein the valve comprises a flowpath that is perpendicular to the axis of the wellbore tubular, wherein the rupture disk initially traps the plug in the valve.

2. The assembly of claim 1, wherein the flow restriction comprises an autonomous inflow control device.

3. The assembly of claim 1, wherein the plug comprises a ball.

4. The assembly of claim 1, wherein the valve is configured to release the plug when the rupture disk is ruptured and the pressure within the exterior of the wellbore tubular is greater than the pressure within the interior of the wellbore tubular.

5. The assembly of claim 1, wherein the plug is configured to at least partially disintegrate or at least partially dissolve in response to a fluid flow through the chamber.

6. The assembly of claim 1, wherein the rupture disk comprises a frangible material.

7. The assembly of claim 1, further comprising a seat, wherein the plug sealingly engages the seat.

8. The assembly of claim 7, wherein the seat, the chamber, and the plug comprise a ball type check valve.

9. The assembly of claim 7, wherein the seat comprises a weep hole, and wherein the weep hole is configured to provide choked fluid communication past the plug.

10. The assembly of claim 7, wherein the seat creates a restriction to flow in addition to that created by the flow restriction.

11. The assembly of claim 7, wherein the seat is configured to at least partially erode in response to a production flow from the exterior of the wellbore tubular into the interior of the wellbore tubular.

12. A method of changing the flow state of a production sleeve comprising:
    pressurizing an interior of a wellbore tubular to a first pressure, wherein the first pressure is greater than a second pressure in an exterior of the wellbore tubular;
    actuating a rupture disk in response to the first pressure, wherein the rupture disk is disposed in a fluid pathway between the exterior of the wellbore tubular and the interior of the wellbore tubular;
    maintaining the first pressure within the interior of the wellbore tubular using a plug, wherein the plug is releasably engaged in the fluid pathway adjacent the rupture disk;
    decreasing the pressure in the interior of the wellbore tubular below the second pressure; and
    establishing fluid communication between the exterior of the wellbore tubular and the interior of the wellbore tubular along the fluid pathway through a first flow restriction in the fluid pathway in response to the decreasing of the pressure in the interior of the wellbore tubular, wherein the first flow restriction is parallel to the axis of the wellbore tubular, wherein the plug and the rupture disk form a valve with a flowpath that is perpendicular to the axis of the wellbore tubular, and wherein the rupture disk initially traps the plug in the valve and prevents flow across the valve, and wherein the valve becomes a one-way valve after actuating the rupture disk.

13. The method of claim 12, further comprising;
    maintaining the first pressure within the interior of the wellbore tubular using the one-way valve, wherein the one-way valve is configured to allow fluid flow from the exterior of the wellbore tubular to the interior of the wellbore tubular while substantially blocking flow from the interior of the wellbore tubular to the exterior of the wellbore tubular; and
    bypassing a second flow restriction in the fluid pathway downstream of the one-way valve.

14. The method of claim 12, further comprising:
    actuating a second rupture disk in response to the first pressure, wherein the second rupture disk is disposed in a second fluid pathway between the exterior of the wellbore tubular and the interior of the wellbore tubular; and
    establishing fluid communication between the exterior of the wellbore tubular and the interior of the wellbore tubular along the second fluid pathway in response to the decreasing of the pressure in the interior of the wellbore tubular.

15. The method of claim 12, wherein the plug is releasably engaged with a seat in the flowpath of the valve.

16. The method of claim 15, further comprising:
    flowing a fluid from the exterior of the wellbore tubular to the interior of the wellbore tubular along the fluid pathway; and
    eroding at least a portion of the seat in response to the fluid flowing through the fluid pathway.

17. The method of claim 15, wherein the seat creates a restriction to flow in addition to that created by the first flow restriction.

18. The method of claim 12, further comprising:
    flowing a fluid from the exterior of the wellbore tubular to the interior of the wellbore tubular along the fluid pathway; and
    eroding at least a portion of the plug in response to the fluid flowing through the fluid pathway.

19. The method of claim 12, further comprising:
    removing substantially the entire rupture disk from the fluid pathway in response to actuating the rupture disk.

* * * * *